United States Patent
Sliva

(10) Patent No.: US 6,608,940 B1
(45) Date of Patent: Aug. 19, 2003

(54) LOSSLESS IMAGE COMPRESSION

(75) Inventor: Thomas E. Sliva, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 439 days.

(21) Appl. No.: 09/608,575

(22) Filed: Jun. 30, 2000

(51) Int. Cl.[7] .............................................. G06K 9/36
(52) U.S. Cl. ..................................................... 382/244
(58) Field of Search ................................ 382/232–250; 375/240–241

(56) References Cited

U.S. PATENT DOCUMENTS

| | | | | |
|---|---|---|---|---|
| 5,621,543 A | * | 4/1997 | Oomoto ...................... | 382/237 |
| 6,055,272 A | * | 4/2000 | Kim ............................ | 372/240 |
| 6,181,825 B1 | * | 1/2001 | Ragland et al. ............. | 382/239 |
| 6,522,784 B1 | * | 2/2003 | Zlotnick ..................... | 382/245 |

* cited by examiner

Primary Examiner—Jingge Wu
(74) Attorney, Agent, or Firm—Blakely, Sokoloff, Taylor & Zafman LLP

(57) ABSTRACT

A lossless image compression method and apparatus is described herein. Accordingly, a first pixel represented by first pixel elements, and a second pixel represented by second pixel elements are selected. A comparison is performed between the first pixel elements and the second pixel elements to determine which, if any, of the first and second pixel elements are identical. The comparison results in a result vector of elements. The result vector is then compressed by removing each element indicating one of the first pixel elements and a corresponding one of the second pixel elements are identical. A value representing the relative positions of the removed elements is then appended to the compressed result vector for later decompression.

24 Claims, 4 Drawing Sheets

FIG. 2B

```
                    35
PIXEL 1    F35490
PIXEL 2    F4448E
PIXEL 3    F35490
PIXEL 4    F355A1
PIXEL 5    E7B373
```

P1 ⊕ P2
```
      F35490
      F4448E
      07101E
      ......
      ......
      ......
BIT   6543210
      ......
      ......
      1100100  = 711E64
                   ↓
```
∴ 07101E BECOMES 711E64

P1 ⊕ P3
```
      F35490
      F35490
      000000
```

40

P1 ⊕ P4
```
      F35490
      F355A1
      000131
      ......
      ......
      ......
BIT   6543210
      ......
      ......
      0111000  = 38 HEX
                  ↓
```
∴ 000131 BECOMES 131 38

P1 ⊕ P5
```
      F35490
      E7B373
      14E7E3
```

45

LOSSLESS IMAGE COMPRESSION

BACKGROUND OF THE INVENTION

1. Field of the Invention

The present invention generally relates to image processing. More specifically, the present invention relates to a lossless image compression algorithm.

2. Background Information

Typically, the performance that may be attained by an integrated circuit (IC) is directly linked to the number of transistors comprising the IC. Although IC technology varies greatly from one manufacturer to another, there is an upper bound as to the number of transistors any given IC may contain due to inherent limitations in IC manufacturing processes. Since, according to Moore's Law, the number of transistors per square inch that can be processed onto an integrated circuit is predicted to double every 18 months, it can safely be assumed that integrated circuit performance will increase correspondingly.

Unfortunately, however, no matter how fast technological advances and associated performance increases are made, there are always manufacturers and/or system integrators that will be slow to implement such new technology. Even with "state of the art" systems that incorporate the latest and greatest technology, consumers are nevertheless often left desiring greater performance. One catalyst behind consumer demand for increased IC (e.g., processor) performance can be associated with the computer graphics industry. Graphics designers, including video game designers for example, often stretch the bounds of technology by designing games, simulations, etc., that are extremely graphics-intensive. Some of these graphics designers push the performance envelope of existing hardware technology such that hardware designers are forced to play catch-up. Unfortunately, however, as soon as the capabilities of the hardware begin to meet the demands of the software and ultimately the consumer, a new software product will be released that once again requires additional hardware support, and so forth.

FIG. 1 is a block diagram illustrating a graphics subsystem within a basic personal computer. System 25 includes CPU 12, memory 14, data storage device 15, graphics engine 16, and frame buffer 18, all of which are coupled together through system bus 10. CPU 12 represents a general purpose processor known in the art to process instructions and data. Memory 14 represents one or more volatile or non-volatile memory storage devices to temporarily store instructions and data to be processed by CPU 12. Data storage device 15 represents a long term data storage device, such as a hard disk drive, to store instructions and data to be processed by CPU 12. Graphics engine 16 represents one or more special purpose integrated circuits to process graphics data received via system bus 10. Graphics engine 16 may represent any number of graphics controllers known in the art such as an AGP or PCI chipset. Although graphics engine 16 is shown coupled to system bus 10, graphics engine 16 may instead be coupled to a local or special purpose bus. Frame buffer 18 represents a data buffer equipped to temporarily store video frames and images processed by graphics engine 16. Frame buffer 18 is coupled to graphics engine 16 via back-end bus 17, which provided greater throughput between frame buffer 18 and graphics engine 16 than is available between graphics engine 16 and memory 14.

Video scenes are often broken down into multiple image frames which are further broken down into pixels. Typically, pixel representations for a currently-displayed frame and a next frame are stored in a buffer, such as frame buffer 18. Depending upon the image resolution, a full screen image may consume large amounts of memory. For example, in a 24-bit color plane (in which the greater the number of bits, the greater the number of colors that may be represented), 3 bytes of data are needed to accurately represent 1 pixel. Moreover, in a 1280×1024 display resolution, the pixel representations would require over 3 Megabytes of storage space per frame! If both a current frame and a next frame are stored, over 6 megabytes of frame buffer storage would be required.

In order to provide realistic and even life-like images and video, software designers often utilize what are known as textures. Textures are used in conjunction with standard wire-frame images to prove an elevated level of realism to computer graphics. Generally, the more textures that are available for use, the more realistic an image can appear. Unfortunately, however, due to storage limitations of the frame buffer, textures are often stored in slower main memory (e.g., memory 14), rather than the faster frame buffer memory (e.g., frame buffer 18). Therefore, if pixel representations stored within the frame buffer could be minimized, additional textures could then be stored in the frame buffer.

BRIEF DESCRIPTION OF THE DRAWINGS

The invention is illustrated by way of example, and not by way of limitation in the figures of the accompanying drawings in which like reference numerals refer to similar elements.

FIG. 2B is a diagram illustrating a compression example performed in accordance with one embodiment of the invention as depicted in FIG. 2B.

DETAILED DESCRIPTION

Figure 1:
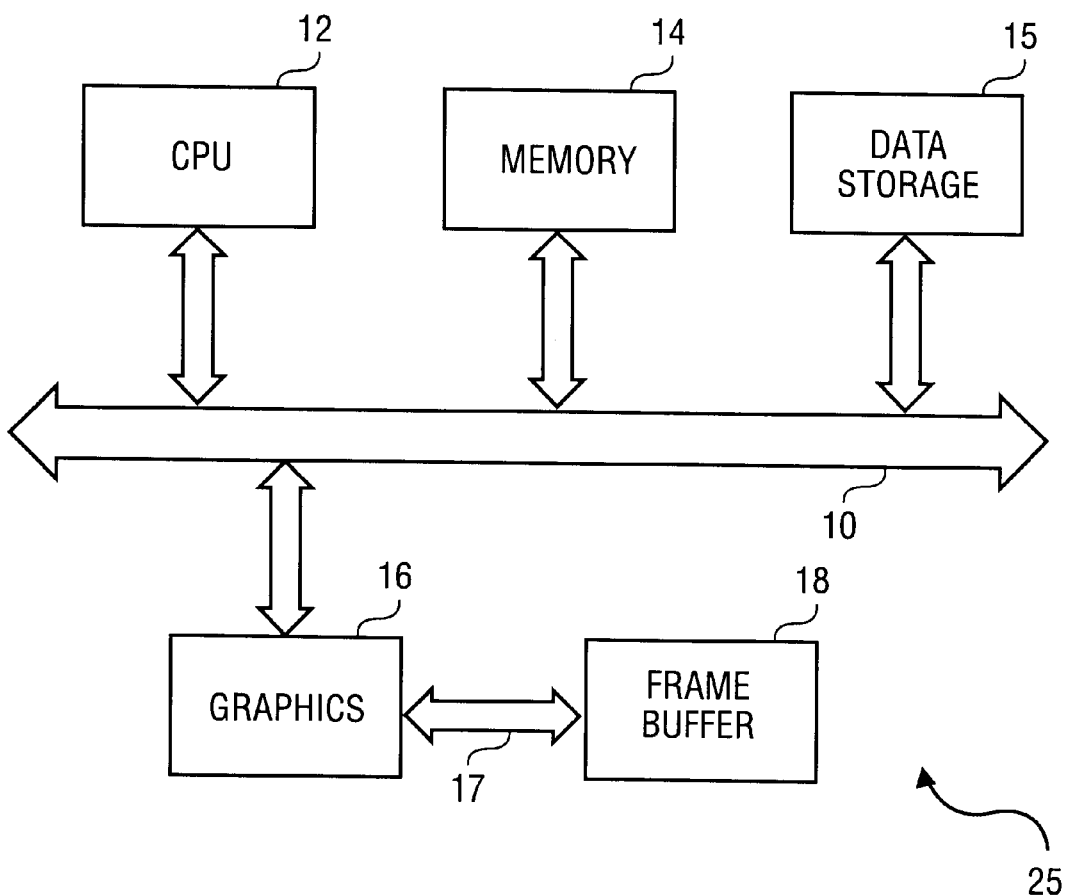
FIG. 1 is a block diagram illustrating a graphics subsystem within a basic personal computer.

A lossless image compression method and apparatus is described herein. Accordingly, a first pixel represented by first pixel elements, and a second pixel represented by second pixel elements are selected. A comparison is performed between the first pixel elements and the second pixel elements to determine which, if any, of the first and second pixel elements are identical. The comparison results in a result vector of elements. The result vector is then compressed by removing each element indicating one of the first pixel elements and a corresponding one of the second pixel elements are identical. A value representing the relative positions of the removed elements is then appended to the compressed result vector for later decompression.

Parts of the following description will be presented using software terminology commonly employed by those skilled in the art to convey the substance of their work to others skilled in the art. As well understood by those skilled in the art, these software quantities take the form of electrical, magnetic, or optical signals capable of being stored, transferred, combined, and otherwise manipulated through mechanical and electrical components of a digital system; and the term digital system includes general purpose as well as special purpose processors, systems, and the like, that are standalone, adjunct or embedded.

Various operations will be described as multiple discrete steps performed in turn, in a manner that is most helpful in understanding the present invention, however, the order of description should not be construed as to imply that these operations are necessarily order dependent, in particular, upon the order the steps are presented. Furthermore, reference in the specification to "one embodiment" or "an embodiment" means that a particular feature, structure, or characteristic described in connection with the embodiment is included in at least one embodiment of the invention. The phrase "in one embodiment" will be used repeatedly, however the phrase does not necessarily refer to the same embodiment, although it may.

If one were to analyze a variety of digital images, it would be apparent that many of the images lack sharp contrast between one color and the next. More likely, the observer would notice that numerous gradations in color exist between one primary color, for example, to the next. These gradations often are formed by numerous pixels configured to display a smooth transitions without harsh contrasts. Many of the pixels, in fact, will be configured to display a color that is identical to many neighboring pixels. Accordingly, by utilizing the data associated with one of the similar pixels, a large portion of the image data with respect to the neighboring pixels may be discarded. In one embodiment of the invention, such spatial similarities between local pixels are exploited.

In one embodiment of the invention, a series of pixel representations are compared against one another to determine the degree of spatial similarity between the pixels. Spatial similarity between pixels may be determined in a number of ways, but one effective mechanism involves the use of the logical exclusive-OR (XOR) operator. Given two input values, the XOR operator will return a value indicating whether the two input values were the same or different.

In one embodiment of the invention, a first numeric pixel representation is XOR'd with a second numeric pixel representation and the result is placed in a buffer. Thus the XOR operation is comparing a first pixel representation against a second pixel representation. Since the XOR operation will determine when a first value is the same as the a second value, the XOR operation will likewise detect whether a first pixel color is the same as a second pixel color. In a 24-bit color plane for example, both the binary and hexadecimal representation for one pixel may be interchangeably XOR'd with a corresponding binary or hexadecimal representation of a second pixel in order to determine if one pixel is identical to another.

In one embodiment of the invention, two 24-bit hexadecimal representations are XOR'd together yielding a result vector. Once obtained, the result vector is examined to determine which elements in the result vector correspond to identical pixel representations, and the positions of those elements are then preserved in a separate compression vector. In one embodiment the positions of each zero within the result vector are preserved in a separate binary compression vector. In one embodiment the compression vector is a 6-bit representation, however, other bit-lengths may be used. In one embodiment, an additional $7^{th}$ bit is used to store a compression flag indicating whether the next pixel is stored compressed or non-compressed. Once the positions of the zeros have been preserved, the zeros are removed from the result vector and the remaining values in the result vector are compressed together. According to one embodiment of the invention, a pixel representation is compressed only if the corresponding result vector includes 4 non-zero hex digits or less. In one embodiment, the compression vector is represented as a hexadecimal value and is appended to the compressed result vector which is then stored in place of the pixel in, for example, the frame buffer.

Figure 2A:
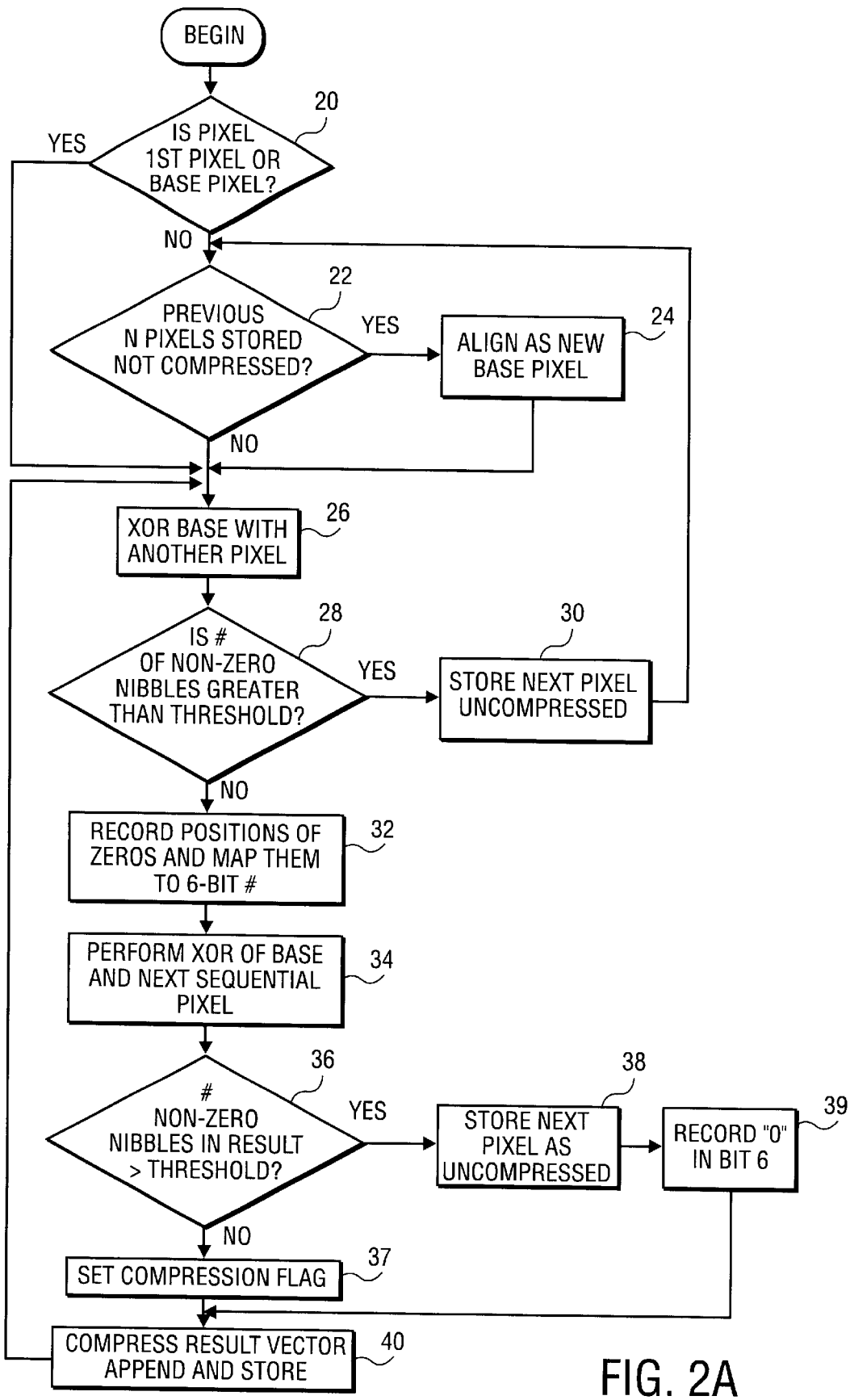
FIG. 2A is a flow diagram illustrating the compression process according to one embodiment of the invention.

FIG. 2A, is a flow diagram illustrating the compression process according to one embodiment of the invention. Prior to beginning the operational flow depicted in FIG. 2A, a group of pixels is first loaded into memory. Once the pixels are in memory, the system selects one of the pixels and determines if it is the first pixel in the image or an assigned base pixel (20). If the selected pixel is the first pixel or base pixel, the compression process begins. If the selected pixel is not the first pixel or a base pixel, the system determines if the N previous pixels are stored as not-compressed. If the N previous pixels are stored as not-compressed then it is likely that the color gradient between the pixels has sufficiently changed such that a new base pixel should be assigned (24) and the compression process begins. Likewise, if N previous pixels are stored as not-compressed (22), then the compression process also begins.

The system first compares the elements of a first pixel representation with the elements of a second pixel representation (26). In one embodiment, a base pixel is XOR'd with the next sequential pixel in memory. The result of the comparison (i.e., result vector) is then examined to determine the number elements within the result vector that correspond to identical elements between the first pixel representation and the second pixel representation. In one embodiment, identical first and second pixel representation elements are indicated in the result vector by one or more zeros. The system determines if the number of non-zero nibbles contained within the result vector is greater than a determined threshold (28). If the threshold of non-zero nibbles has been exceeded, it is an indication that the next pixel will be stored not-compressed (30). In one embodiment, if the result vector contains more than four non-zero hex nibbles, the next pixel is stored uncompressed (30). If the threshold of non-zero nibbles has not been exceeded, it is an indication that the pixel will be compressed. Accordingly, the positions of all the zeros within the result vector are determined and preserved in a separate compression vector (32). In one embodiment, the compression vector is a 6-bit binary representation, however, other binary and non-binary representations alike may be used.

The system next compares the elements of the base (or first) pixel representation with the elements of a third pixel representation (34). In one embodiment, the third pixel is the next sequential pixel in memory after the second pixel. Once again the system determines if the number of non-zero nibbles contained within the result vector is greater than a determined threshold (36). If so, then the next pixel is stored as uncompressed (38) and a "0" is recorded in bit position 6 of the compression vector associated with the first and second pixels. If the number of non-zero nibbles contained within the result vector is not greater than a determined threshold, then a compression flag is set within the compression vector (37) associated with the first and second pixels. In one embodiment, the compression flag is set by recording a "1" in bit position 6 of the compression vector. If it is determined that the pixel is to be compressed, all zeros within the result vector are dropped and the remaining elements are "squeezed" together. The compression vector is then appended to the result vector and the result is stored.

FIG. 2B is a diagram illustrating an example of the compression process performed in accordance with one embodiment of the invention as depicted in FIG. 2B. Table 35 indicates five hexadecimal pixel representations. Box 40 illustrates the XOR comparison between a base pixel (e.g., pixel 1), and a second pixel (e.g., pixel 2). The result vector for the two values is 07101EH. The placement of the zeros within the result vector are preserved by the 6 bits (e.g., 0–5) of the compression vector. In one embodiment, "1's" are used in the compression vector to indicate the placement of zeros in the result vector, however, other variations may be used. The $7^{th}$ bit or compression flag of the compression vector is determined through a look-ahead XOR, where the pixel representations of the first pixel and the third pixel are XOR'd. Because there are less than four non-zero elements, a "1" is stored in bit 6 of the compression vector. The compression vector "1100100" is then converted to a hexadecimal representation of 64H, which is appended to the "squeezed" result vector giving: 711E64. The above described process is equally applicable to box 45.

Figure 3:
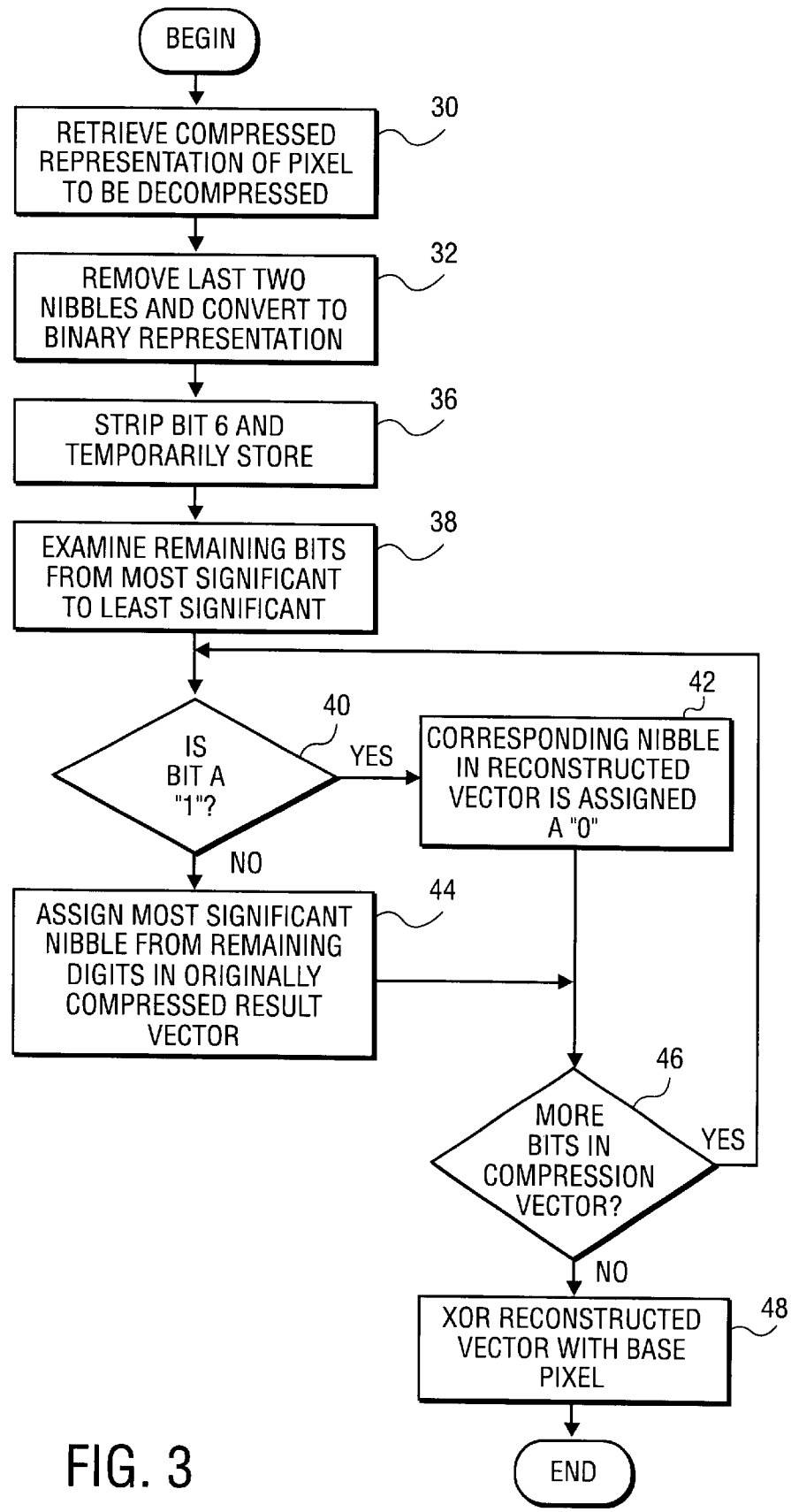
FIG. 3 is a flow diagram illustrating one embodiment of the decompression process.

Once the pixel representations have been compressed, they will likely need to be decompressed into a decompression vector, for example. FIG. 3 is a flow diagram illustrating one embodiment of the decompression process. First, a compressed pixel representation is selected (30) and the last two nibbles are removed and converted to a binary representation (32). Bit 6 of this binary representation corresponds to the compression flag which indicates whether the next sequential pixel is stored as compressed. Accordingly, bit 6 is stripped from the compressed pixel representation and used for processing of the next pixel (36). Thereafter, bits 5 through 0 are examined in succession with most significant bit 5 being examined first and least significant bit 0 being examined last (38). If it is determined that the bit being examined has a value of "1," then the corresponding bit in the decompression vector is assigned a "0" (42). If, however, it is determined that the bit being examined has a value of "0," then the corresponding bit in the decompression vector is assigned the same value as the most significant nibble remaining in the originally compressed result vector (44). If additional bits remain, the value of the next sequential bit is then examined (46). If no further bits remain, the decompression vector is XOR'd with the base pixel to obtain the original uncompressed pixel representation (48).

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A method comprising:
    selecting a first pixel represented by a first plurality of elements;
    selecting a second pixel represented by a second plurality of elements;
    performing a comparison between the first plurality of elements and the second plurality of elements to determine which ones of the first and second pluralities of elements are identical, the comparison resulting in a result vector of elements;
    compressing the result vector by removing each element that indicates one of the first and a corresponding one of the second plurality of elements are identical; and
    appending to the compressed result vector, a value representing the removed elements.

2. The method of claim 1, wherein the result vector is compressed only more than a threshold number of the first and second plurality of elements are found to be identical.

3. The method of claim 2, wherein the result vector is compressed only if more than two of the first and second plurality of elements are found to be identical.

4. The method of claim 1, wherein at least one of the first and second plurality of elements comprises a 24-bit graphic representation.

5. The method of claim 1, wherein performing a comparison between the first and second plurality of elements further comprises performing an XOR operation between the first and second plurality of elements.

6. The method of claim 1, wherein the value representing the removed elements comprises a compression vector.

7. The method of claim 6, wherein the relative positions of each of the removed result vector elements is preserved in the compression vector.

8. The method of claim 6, further comprising:
    locating a third pixel represented by a third plurality of elements;
    performing a comparison between the first plurality of elements and the third plurality of elements to determine which ones of the first and third pluralities of elements are identical, the comparison resulting in a second result vector of elements; and
    setting a compression flag within the compression vector, if more than a threshold number of identical elements exist between the first and third pluralities of elements.

9. An article comprising:
    a machine readable medium having stored thereon a plurality of machine readable instructions, wherein when executed, the instructions cause a processor to:
    select a first pixel represented by a first plurality of elements;
    select a second pixel represented by a second plurality of elements;
    perform a comparison between the first plurality of elements and the second plurality of elements to determine which ones of the first and second pluralities of elements are identical, the comparison resulting in a result vector of elements;
    compress the result vector by removing each element that indicates one of the first and a corresponding one of the second plurality of elements are identical; and
    append to the compressed result vector, a value representing the removed elements.

10. The article of claim 9, wherein the result vector is compressed only if more than a threshold number of the first and second plurality of elements are found to be identical.

11. The article of claim 10, wherein the result vector is compressed only if more than two of the first and second plurality of elements are found to be identical.

12. The article of claim 9, wherein at least one of the first and second plurality of elements comprises a 24-bit graphic representation.

13. The article of claim 9, wherein the instructions to perform a comparison between the first and second plurality of elements further comprise instructions to perform an XOR operation between the first and second plurality of elements.

14. The article of claim 9, wherein the value representing the removed elements comprises a compression vector.

15. The article of claim 14, wherein the relative positions of each of the removed result vector elements is preserved in the compression vector.

16. The article of claim 14, further comprising instructions to:
    locate a third pixel represented by a third plurality of elements;
    perform a comparison between the first plurality of elements and the third plurality of elements to determine which ones of the first and third pluralities of elements are identical, the comparison resulting in a second result vector of elements; and set a compression flag within the compression vector, if more than a threshold number of identical elements exist between the first and third pluralities of elements.

17. An apparatus comprising:

a machine readable medium having stored thereon a plurality of machine readable instructions, wherein when executed, the instructions cause a processor to:

select a first pixel represented by a first plurality of elements;

select a second pixel represented by a second plurality of elements;

perform a comparison between the first plurality of elements and the second plurality of elements to determine which ones of the first and second pluralities of elements are identical, the comparison resulting in a result vector of elements;

compress the result vector by removing each element that indicates one of the first and a corresponding one of the second plurality of elements are identical; and append to the compressed result vector, a value representing the removed elements; and a processor to execute the instructions.

18. The apparatus of claim 17, wherein the result vector is compressed only if more than a threshold number of the first and second plurality of elements are found to be identical.

19. The apparatus of claim 18, wherein the result vector is compressed only if more than two of the first and second plurality of elements are found to be identical.

20. The apparatus of claim 17, wherein at least one of the first and second plurality of elements comprises a 24-bit graphic representation.

21. The apparatus of claim 17, wherein the instructions to perform a comparison between the first and second plurality of elements further comprise instructions to perform an XOR operation between the first and second plurality of elements.

22. The apparatus of claim 17, wherein the value representing the removed elements comprises a compression vector.

23. The apparatus of claim 22, wherein the relative positions of each of the removed result vector elements is preserved in the compression vector.

24. The apparatus of claim 22, further comprising instructions to:

locate a third pixel represented by a third plurality of elements;

perform a comparison between the first plurality of elements and the third plurality of elements to determine which ones of the first and third pluralities of elements are identical, the comparison resulting in a second result vector of elements; and set a compression flag within the compression vector, if more than a threshold number of identical elements exist between the first and third pluralities of elements.

* * * * *

UNITED STATES PATENT AND TRADEMARK OFFICE
CERTIFICATE OF CORRECTION

PATENT NO. : 6,608,940 B1
DATED : August 19, 2003
INVENTOR(S) : Silva

It is certified that error appears in the above-identified patent and that said Letters Patent is hereby corrected as shown below:

Column 5,
Line 64, insert -- if -- after the word "only".

Signed and Sealed this

Twenty-first Day of September, 2004

JON W. DUDAS
*Director of the United States Patent and Trademark Office*